United States Patent
Jacob

(10) Patent No.: US 6,786,158 B2
(45) Date of Patent: Sep. 7, 2004

(54) RAILCAR-MOVING VEHICLE WITH LOAD-SHIFTING DEVICE

(76) Inventor: Charles Jacob, P.O. Box 611, American Fork, UT (US) 84003

( * ) Notice: Subject to any disclaimer, the term of this patent is extended or adjusted under 35 U.S.C. 154(b) by 0 days.

(21) Appl. No.: 10/617,005

(22) Filed: Jul. 10, 2003

(65) Prior Publication Data

US 2004/0089192 A1 May 13, 2004

Related U.S. Application Data

(63) Continuation-in-part of application No. 10/005,215, filed on Dec. 3, 2001, now abandoned, which is a continuation of application No. 09/261,674, filed on Mar. 3, 1999, now Pat. No. 6,324,993.

(51) Int. Cl.$^7$ ............................................... B61C 11/00

(52) U.S. Cl. ..................................................... 105/72.2

(58) Field of Search .......................... 105/72.2, 75, 82, 105/215.1, 215.2; 213/75 R

(56) References Cited

U.S. PATENT DOCUMENTS

| | | | | |
|---|---|---|---|---|
| 5,740,742 A | * | 4/1998 | Bush | 105/72.2 |
| 5,868,078 A | * | 2/1999 | Madison | 105/72.2 |
| 6,598,538 B2 | * | 7/2003 | Semple et al. | 105/215.2 |

* cited by examiner

Primary Examiner—S. Joseph Morano
Assistant Examiner—Robert J. McCarry, Jr.
(74) Attorney, Agent, or Firm—Thorpe North & Western, LLP

(57) ABSTRACT

A railcar-moving vehicle comprises a modified semi tractor with retractable railroad wheels and an air bag suspension system. A load-shifting device is pivotally disposed rearward on the vehicle frame, and includes a lifting coupler configured to couple to a coupler of a railcar. A coupler airbag is disposed below the lifting coupler, and configured to inflate with compressed air concurrently with the air bag suspension system, so as to simultaneously apply upward force upon the coupler of the railcar and downward force on the drive wheels, which directly contact the rails, so as to transfer a portion of the weight of the railcar to the drive wheels of the railcar-moving vehicle. The railcar-moving vehicle is capable of extended operation at highway speeds both on and off rails.

23 Claims, 7 Drawing Sheets

RAILCAR-MOVING VEHICLE WITH LOAD-SHIFTING DEVICE

This application is a continuation-in-part of U.S. patent application Ser. No. 10/005,215, filed on Dec. 3, 2001 now abandoned, and entitled HYDRAULIC LOAD-SHIFTING DEVICE FOR DRAWBAR, which is a continuation of U.S. patent application Ser. No. 09/261,674, filed on Mar. 3, 1999, now issued as U.S. Pat. No. 6,324,993.

BACKGROUND OF THE INVENTION

1. Field of the Invention

This invention relates to railcar-moving vehicles that are adaptable both for moving railcars along railroad track and for pulling trailers on roadways. More particularly, the present invention relates to a railcar-moving vehicle that also functions as a rubber-tired highway vehicle, and which incorporates an improved load-shifting device for transferring a portion of the railcar load to the drive wheels of the vehicle in order to improve traction.

2. State of the Art

In the railroad industry, maintenance of way is a critical activity and a major expense. Frequently, when maintenance is needed at a particular location along the right-of-way and heavy equipment or materials are required, a work train and crew are sent to that location to perform the needed repairs. For example, a work train may carry a load of railroad ties and short sections of rail for repairing track, and may include some pieces of heavy equipment for unloading and installing these items. Often, a work train consists of a locomotive pulling a single work car, and the maintenance work can be performed by one or two workers.

However, this approach can be very cost inefficient. Because maintenance of way crews and locomotive crews are differently trained and unable to perform each other's duties, the work train will frequently employ a crew much larger than actually needed at any given time. Obviously, this is costly. Furthermore, the use of a typical locomotive—which may cost in excess of a million dollars—to transport a single car and a few workers is extremely cost inefficient. For these reasons, it would be desirable to have a railcar-moving vehicle that can pull one or a few railcars along the railroad track at mainline speeds, but that is not a conventional locomotive, and thus is not as costly as a locomotive, nor requires a full locomotive crew. With such a vehicle a work crew could transport themselves to the work site with their materials and equipment, and perform the work with far less expense for labor and equipment.

Additionally, it would be desirable to have such a railcar-moving vehicle that is operable both on rails and on roadways. Such a vehicle would be valuable for maintenance of way crews by allowing a work crew to transport themselves and their equipment by highway to a rail siding, where the crew simply transfers their materials and equipment to a waiting railcar, and uses the semi tractor on the rails to pull the work railcar to the work site.

This sort of vehicle would have additional uses, as well. For example, many railroad customers have a need to move railcars and highway trailers around a rail yard or industrial site. However, except for the largest industries, the cost to purchase and maintain a conventional switching locomotive is prohibitive or economically unwarranted. Thus, lightweight multipurpose railcar-moving vehicles have been developed and used to perform many functions normally assigned to switching locomotives, but which may also be used off the track. Such modified or hybrid vehicles are more economical for many industries because of their relatively low cost and high versatility. They allow smaller industries to take advantage of the efficiency and economy of rail transport for heavy freight where otherwise they would not be able to do so.

However, conventional lightweight railcar-moving vehicles are still relatively highly specialized, limited production vehicles. The cost per horsepower of these vehicles is significantly higher than the cost of a conventional semi tractor, for example, which enjoys the cost advantages of greater mass production. Additionally, conventional railcar-moving vehicles are not designed or configured to operate on public highways as long or short haul trucks, but are confined to an industrial site or switching yard. Many of them do not have the functional and safety equipment required to be street legal, and are designed for low speed operation only, being unable to travel at speeds beyond 15 to 20 miles per hour. Moreover, they cannot operate at top speed for extended periods of time without overheating their hydraulic systems. It would thus be desirable to have a railcar-moving vehicle which is constructed from a mass produced vehicle, such as a semi tractor, so as to reduce the acquisition cost of these vehicles. It would also be desirable to have a railcar-moving vehicle which is capable of extended operation at high speeds and can be conveniently and legally used for either long or short haul transport of freight on public highways.

Because a loaded railcar may be much heavier than one of these lightweight traction vehicles, various methods have been developed to transfer a portion of the weight of the railcar to the traction vehicle. These methods typically involve some sort of hydraulic system which applies a vertical force to the drawbar of an attached railcar, so as to transfer a portion of the weight of the railcar to the traction vehicle. This transfer helps provide traction to the railcar-moving vehicle to allow it to move the railcar without slippage of the drive wheels on the track. However, the devices now known typically involve a coupler extending from one end of the vehicle which lifts the load outboard of the drive and support axles of the vehicle. The load-shifting mechanism does not provide any horizontal movement so as to move the bearing point of the load more directly over the wheels of the traction vehicle. Those knowledgeable in mechanical design will understand that placing the load closer to the nearest supporting axle or between a pair of supporting axles will distribute the load more evenly, and in the case of multiple drive axles, will thereby provide more traction. Additionally, placing the load closer to the nearest supporting axle or between the axles will reduce the moment which tends to lift the end of the vehicle opposite the load. It would thus be desirable to have a railcar-moving vehicle which both lifts and forwardly advances a coupled railcar so as to transfer a portion of the load of the railcar to the vehicle and to move the point of bearing of the load closer to the nearest supporting axle, or between supporting axles.

SUMMARY OF THE INVENTION

The invention advantageously provides railcar-moving vehicle that is capable of extended operation at highway speeds both on and off rails. The vehicle comprises a modified semi tractor with retractable railroad wheels and an air bag suspension system. A load-shifting device is pivotally disposed rearwardly on the vehicle frame, to which the rearward rail wheels are attached. The load-shifting device includes a lifting coupler configured to couple to a coupler of a railcar. A coupler airbag is disposed between the rearward rail wheels and the lifting coupler, and is configured to inflate with compressed air concurrently with the air bag suspension system, so as to apply upward force upon the coupler of the railcar and downward force on the drive wheels, which directly contact the rails, so as to transfer a portion of the weight of the railcar to the drive wheels of the railcar-moving vehicle.

Other objects and features of the present invention will be apparent to those skilled in the art, based on the following description, taken in combination with the accompanying drawings.

DETAILED DESCRIPTION

Figure 1:
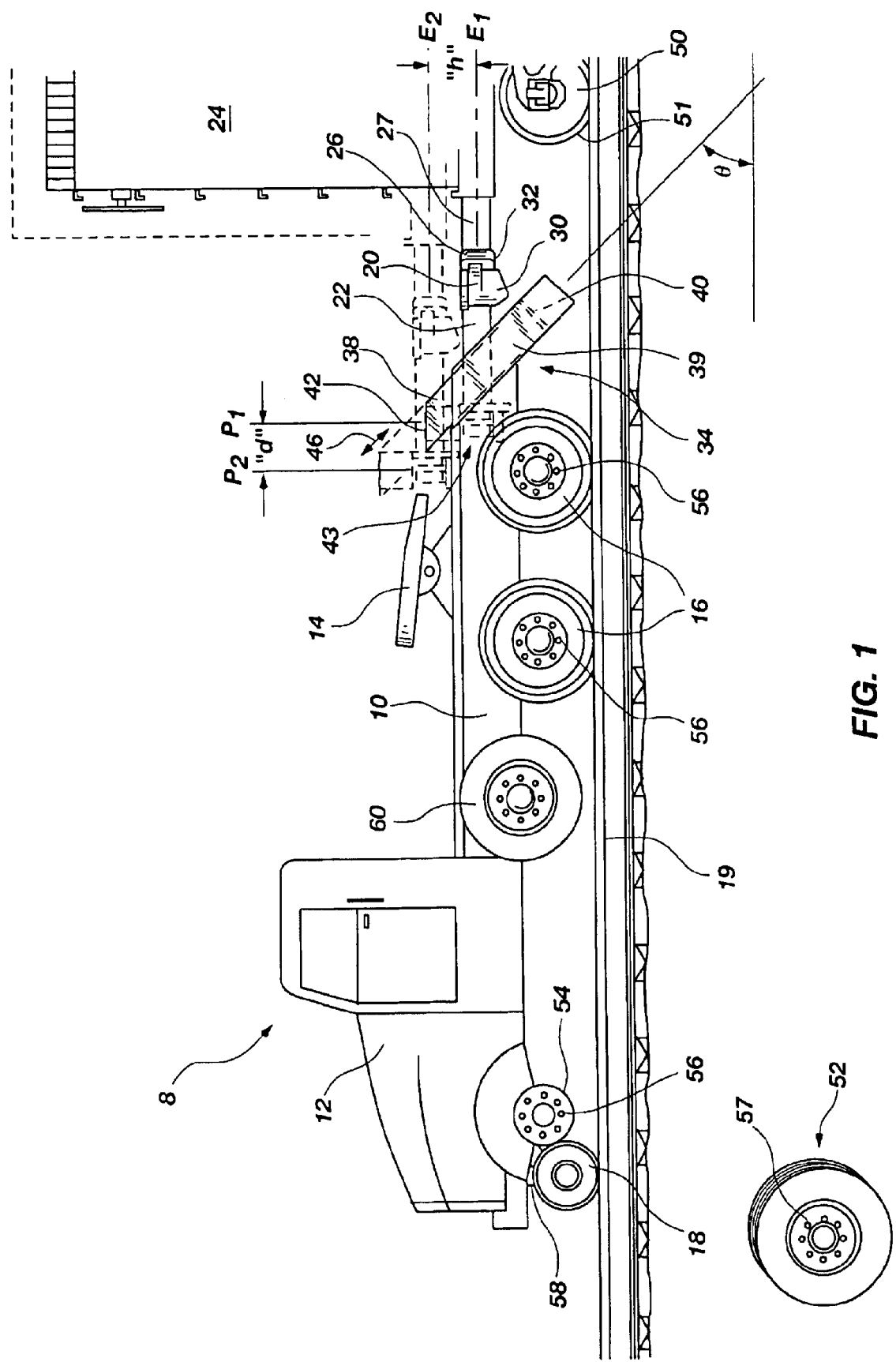
FIG. 1 is a side view of a semi tractor configured for use as a railcar-moving vehicle and coupled to a railcar, and provided with a load-shifting device in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
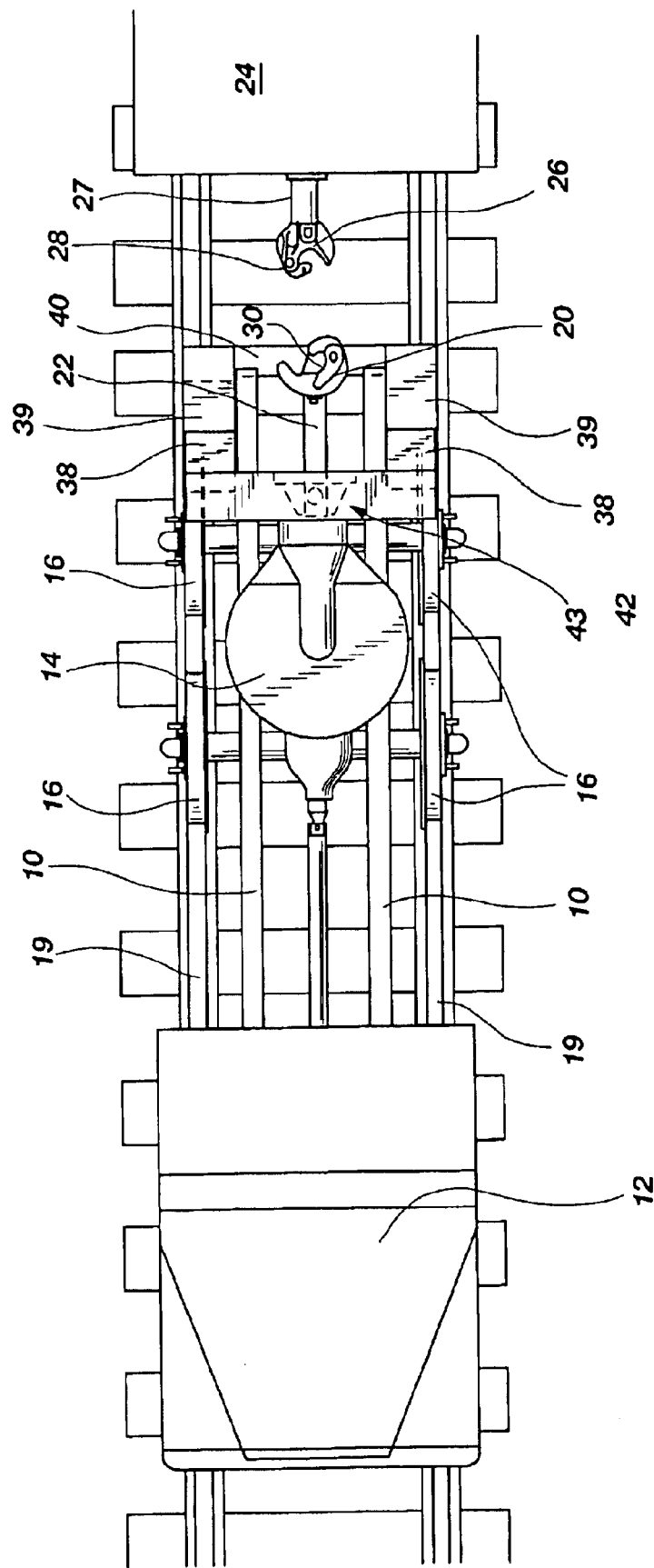
FIG. 2 shows a top view of the railcar-moving vehicle including the load-shifting device according to the present invention.

FIG. 1 is a side view of a semi tractor 8 configured for use as a railcar-moving vehicle coupled to a railcar 24. It is to be understood that the opposite side of the truck is essentially a mirror image of the side shown, and that most components depicted in FIG. 1 have a mirror image counterpart on the opposite side of the vehicle. FIG. 2 is a top view of the same, but uncoupled from the railcar 24.

The tractor 8 is a conventional semi tractor in most respects, having an elongate frame 10, cab 12 housing the engine and controls, and standard fifth-wheel assembly 14 for pivotally connecting the tractor to a conventional highway trailer. However, to function as a railcar-moving vehicle, the tractor 8 is provided with railroad wheels 16 and 18 for use on railroad tracks 19, instead of rubber tired wheels for roadway use. The drive wheels 16 are at the rear of the tractor, and typically smaller guide wheels 18 support the front of the vehicle. It will be apparent that the drive wheels 16 must be affixed to the drive axles of the tractor so as to propel the vehicle. As shown in FIG. 1, the vehicle 8 is also provided with unpowered rubber tired auxiliary wheels 60 which are common on large trucks, and which may be selectively raised and lowered by hydraulic or pneumatic means for contact with a roadway so as to spread the weight when the truck is carrying a particularly heavy load. It will be apparent that these auxiliary wheels will be retracted and not engaged when the vehicle is operating on railroad tracks.

When configured for use as a railcar-moving vehicle, the rubber-tired wheels 52 used for highway operation are removed. It is clear from FIG. 1 that with the guide wheels 18 supporting the load of the tractor cab, the bare front wheel hub 54 of the tractor is suspended above the rails 19, with its lug bolts 56 exposed. The guide wheels 18 are preferably hydraulically retractable by a support mechanism 58 so that when the rubber tired tractor wheels 52 are installed and the tractor is operated on roadways, the railroad guide wheels 18 are not in the way. It will also be apparent that the guide wheels 18 could be hydraulically extendable so that removal of the rubber tired front tractor wheels is not necessary in order to configure the vehicle for use on the rails.

The railroad drive wheels 16 are configured somewhat differently than the guide wheels 18. Instead of a separate set of retractable wheels, the railroad drive wheels and roadway wheels utilize the same axles, and herein lies one of the advantageous features of the present invention. Because the rails of standard railroad track are closer together than the standard wheelbase width of highway trucks, the railroad drive wheels 16 may be affixed to the drive axles of the tractor in place of the usual inner dual wheel member of semi-tractor wheels. The outer hub of the railroad drive wheels 16 is provided with lug bolts 56 so that a rubber tired truck wheel 52 may be affixed directly to the outside of each railroad drive wheel 16. Because with this configuration the vehicle will not have dual wheels as is normally the case with semi tractors, the auxiliary wheels 60 may be needed during normal highway operation, and oversized, higher load capacity rubber tired truck wheels 52 may also be provided to support the trailer load during highway operation. The rubber tired truck wheels 52 are naturally provided with a plurality of holes 57 for matching the lug bolts 56. It will be apparent that the railroad drive wheels 16 are smaller in diameter than the truck tires so as to prevent the railroad drive wheels from interfering with roadway operation. However, this configuration avoids the need to remove the railroad drive wheels 16 whenever it is desired to use the tractor 8 on roadways, rather than on rails.

Figure 3:
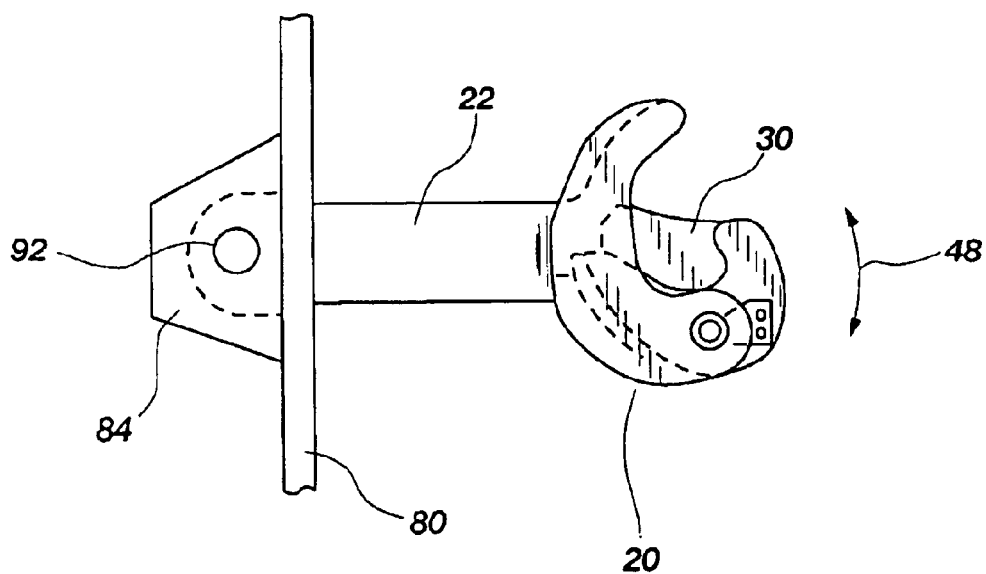
FIG. 3 shows a top view of the lifting coupler and drawbar of the load-shifting device of the present invention.

Attached to the rearward portion of the frame 10, immediately behind the fifth wheel assembly 14, is a coupler 20 and drawbar 22 for coupling to a typical railcar, such as a boxcar 24, as depicted in FIG. 1. This coupler allows the vehicle 8 to propel the railcar 24 along the railroad tracks 19. In accordance with the present invention, the coupler 20 is of the lifting type, being configured to lock with the knuckles 28 of a conventional coupler 26, shown on the boxcar 24. The lifting coupler 20 not only provides secure engagement of a standard coupler 26, to allow the vehicle 8 to push and pull the railcar 24 as with all conventional couplers, but also includes a lower support surface 30, shown more clearly in FIG. 3, which provides a top view of the present invention. The support surface 30 engages the bottom surface 32 of a standard coupler, and allows the lifting coupler to impart significant upward force on the coupler 26 and drawbar 27 of the railcar 24. The advantages of this configuration will be more completely apparent hereafter.

Figure 4:
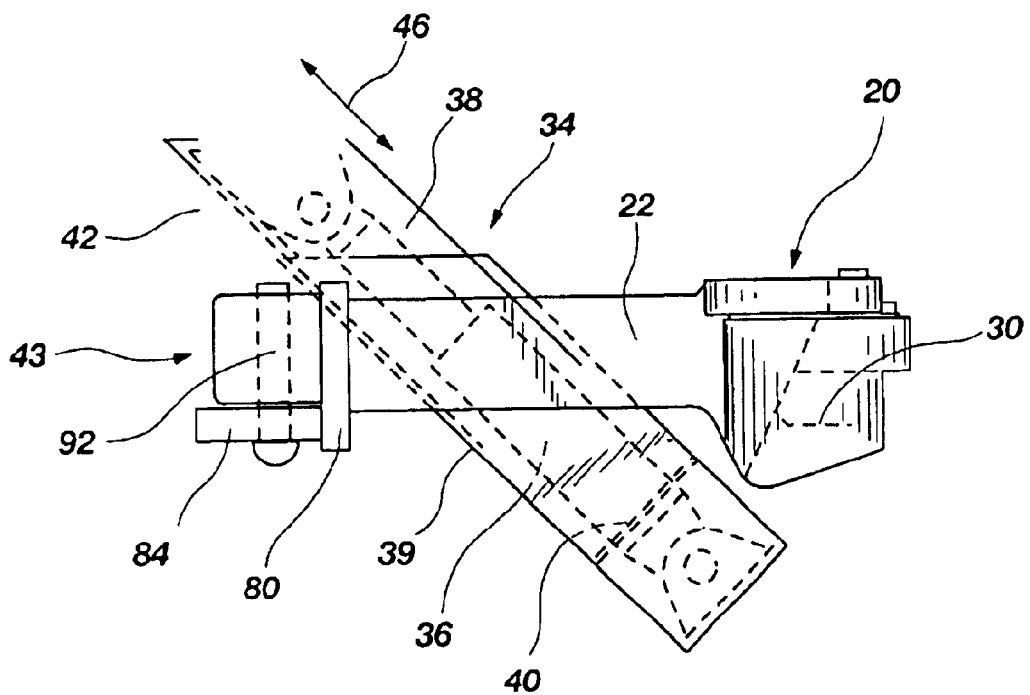
FIG. 4 shows a partial side sectional view of the lifting coupler and hydraulic lift assembly of the present invention.

The lifting coupler 20 and drawbar 22 are connected to the frame 10 by means of a lifting mechanism indicated generally at 34, and best viewed with reference to FIGS. 1, 2, and 4. FIG. 4 provides a partial side sectional view of the lifting coupler 20 and lift assembly 34 of the present invention. As shown in FIG. 4, the lifting mechanism 34 is comprised of one or more hydraulic cylinders 36 which are pin connected inside telescoping tubular steel members. The telescoping members generally comprise a base 39 which is fixedly attached to the rear extremity of the vehicle frame 10 on opposing sides thereof, and a smaller sized telescoping support arm 38 which is recessed into the tubular base member 39. The purpose of the telescoping members 38 and 39 is to provide rigid mechanical support for the imposed loads at various stages of extension in order to prevent damage to the seal of the hydraulic cylinders 36. The hydraulic cylinders 36 are pin connected within the telescoping members so that only axial loads are transmitted thereto. Those skilled in the art will understand that the imposition of significant bending moments upon typical hydraulic actuators will lead to their premature failure. It will also be apparent to one skilled in the art that the lifting mechanism 34 could be comprised of hydraulic cylinders 36 alone, without the use of telescoping members 38 and 39. However, some structure will generally be required to ensure that the forces on the hydraulic cylinders are not such as will impair its functioning.

The telescoping members 38 and 39 may be of various configurations, such as round or rectangular in cross section. In the appended figures they are shown as approximately square in cross-section. The lower ends of the base members 39 are braced with a cross brace 40, and the support arms 38 are rigidly connected together by a crossbar 42. Connected to the crossbar 42 approximately at its midpoint is the drawbar mounting assembly 43, shown more clearly in FIG. 3. As shown in the top view of FIG. 3, the drawbar mounting assembly 43 comprises a vertically oriented drawbar support plate 80, a horizontally oriented hinge support plate 84 affixed to the drawbar support plate 80, and a hinge pin 92, which rotatably fixes the end of the drawbar opposite the coupler so that the drawbar and coupler may freely pivot about the pin 92 as shown by arrow 48. It will be apparent that other configurations of the drawbar mounting assembly that are sufficient to withstand the loads imposed by lifting a loaded railcar may be advantageously employed in accordance with the present invention.

As shown in the top view of FIG. 2, the telescoping members 38 and 39 are oriented in line with frame 10 of the vehicle, but are oriented at some forward leaning angle θ with respect to the horizontal, as shown in FIG. 1. This angular orientation allows the lift assembly 34 to shift the weight of a coupled railcar 24 from a first position in which its weight is supported by its own trucks, shown in solid lines in FIG. 1, to a second position, shown in phantom line in FIG. 1, wherein the railcar has been lifted up and forward to add additional weight to the drive wheels 16 of the railcar-moving vehicle 8. The angle θ may be any angle which both lifts the attached railcar and moves it forward so as to bear more directly on the drive wheels of the railcar-moving vehicle. In the preferred embodiment, θ is approximately 45°, but it will be apparent that other angles may be used.

When the weight of an attached railcar is to be lifted and shifted forward over the drive wheels, a hydraulic actuator (not shown) increases the hydraulic pressure within the cylinders 36, causing the support arms 38 to extend axially from the base member 39, thereby lifting the crossbar 42 and the drawbar mounting assembly 43 diagonally up and forward in the direction of arrow 46. When moved in this way, the point at which the load of the railcar bears on the frame of the railcar-moving vehicle moves horizontally from bearing point $P_1$ some distance "d" to bearing point $P_2$. It will be apparent to those skilled in mechanical design that because point $P_2$ is closer to the nearest drive wheel than is point $P_1$, the imposed weight of the railcar will be more evenly distributed to both sets of drive wheels, and less uplifting moment will be created which tends to lift the front of the railcar-moving vehicle. Additionally, the elevation of the railcar moves vertically from elevation $E_1$ some distance h to elevation $E_2$. It will be apparent that with the cylinders 36 oriented at a 45° angle, "d" and "h" will be equal.

The lifting mechanism 34 is preferably provided with a power down feature. When lowering the lifting assembly 34, the hydraulic actuator does not merely release pressure and allow gravity to force the mechanism down. Instead, the hydraulic actuator provides downward pressure in the cylinders 36, allowing the support arms 38 to move back to their first position under force. This feature provides many benefits. First, it allows the lift mechanism 34 to be used in combination with a support post or bar as a jack for removing or installing roadway tires on drive wheels of the railcar-moving vehicle. It also allows the vehicle to lift itself back onto the rails in case of derailment.

When transferring the load of a railcar, the distance the railcar must be lifted, and hence the distance the support arms must advance, is dependent on the weight of the railcar and the amount of depression of the railcar support springs under the normal load of the car. Typical railcars employ springs to resiliently support the weight of the loaded car with a maximum travel of 6" to 8". Thus, to completely remove the load from the forward truck of a loaded railcar, a load-shifting device generally needs to provide a vertical lift of less than 6". However, the inventor has found that it is neither desirable nor necessary to completely unload the forward truck of the attached railcar, but merely to remove a portion of the load. Naturally, only as much load as is needed for traction should be transferred to the railcar-moving vehicle. Furthermore, it is desirable for the railcar wheels 50 and flanges 51 to remain in firm contact with the rails so as to prevent derailment. The inventor has found that with a 45° cylinder angle, providing support arms 38 and hydraulic cylinders 36 with a total travel of approximately 20 inches is sufficient to shift the weight needed for traction. Those skilled in the art will understand that some semi tractors include compliant pneumatic suspension systems for their drive wheels, though many do not. It will be apparent that in the case of a vehicle having a pneumatic suspension, the suspension will be depressed some amount during the load shifting process. Consequently the lifting mechanism 34 must have sufficient travel to allow for this additional flexure. In the process of load shifting, the drawbars 22 and 27 also flex some amount, in addition to the extension of the railcar springs. The inventor has found that given all sources of flexure, the springs of the railcar typically only extend or unload by approximately 3", whether the railcar is loaded or unloaded, before the load transfer is sufficient.

As shown in FIG. 1, when in the lifted position, the frame of the railcar 24 will not be parallel to the railroad track, but will be disposed at some slight angle relative thereto as a result of the lifting. It will be apparent that when lifting the front end of the railcar, the trucks on the opposite end of the railcar will act as a fulcrum, with the frame of the railcar rotating thereabout as a lever. As a result, the railcar drawbar 27, which is designed to be essentially rigid in the vertical plane, will rotate with the frame of the railcar and assume the same angle relative to the tracks. While this rotation of the drawbar may be relatively slight because the length of typical railcars (50' to 80') is very large compared to the distance of vertical lift (≈3"), even slight rotation of one coupler relative to the other can induce substantial stresses in the joined couplers. Consequently, in one embodiment, the present invention is designed to allow slight concomitant rotation of the drawbar 22 of the railcar-moving vehicle so as to allow continued axial alignment of the vehicle drawbar 22 and the railcar drawbar 27 to reduce these stresses. This rotational feature may be easily provided to the vehicle of the present invention by selecting structural steel members for the cross bar 42 and drawbar mounting assembly 43 that will provide appropriate flexure when under stresses at levels potentially excessive for the coupler 20 and drawbar 22. Conversely, there may be situations in which even slight rotation of the drawbar 22 is unwanted. For these situations, rotation may be prevented by selecting structural steel members for the cross bar 42 and drawbar mounting assembly 43 that will experience negligible flexure when under anticipated loads.

It will be apparent that the lift assembly 34 need not be hydraulic, but may be configured in any manner known in the art that will provide sufficient force to lift the front of a loaded railcar. For example, a pneumatic mechanism, or an electromechanical mechanism such as a screw jack could be advantageously employed. The hydraulic lift assembly shown herein provides a quiet running yet fast operating system for shifting the railcar load. Furthermore, the hydraulic lift mechanism allows the operator to monitor the amount of load shifted simply by viewing the hydraulic pressure gage which is naturally a part of the system. An electromechanical lifting mechanism, on the other hand, would require additional features to allow monitoring of the load.

Depicted in FIGS. 5–8 is an alternative embodiment of the present invention, incorporating a pneumatic load-shifting mechanism. As with the other embodiments previously described, the vehicle 108 is a modified semi tractor, having an elongate frame 110, a cab 112 housing the engine and controls, and a standard fifth-wheel assembly 114 for pivotally connecting the tractor to a conventional highway trailer. The vehicle includes conventional rubber-tired front wheels 154 and drive wheels 156 for driving on a roadway 106. However, to function as a railcar-moving vehicle, the tractor 108 is also provided with retractable high-rail wheels 118 disposed at the front of the vehicle, and high-rail wheels 116 disposed on a pivotable pneumatic load-shifting mechanism 134 at the rear of the vehicle.

Figure 5:
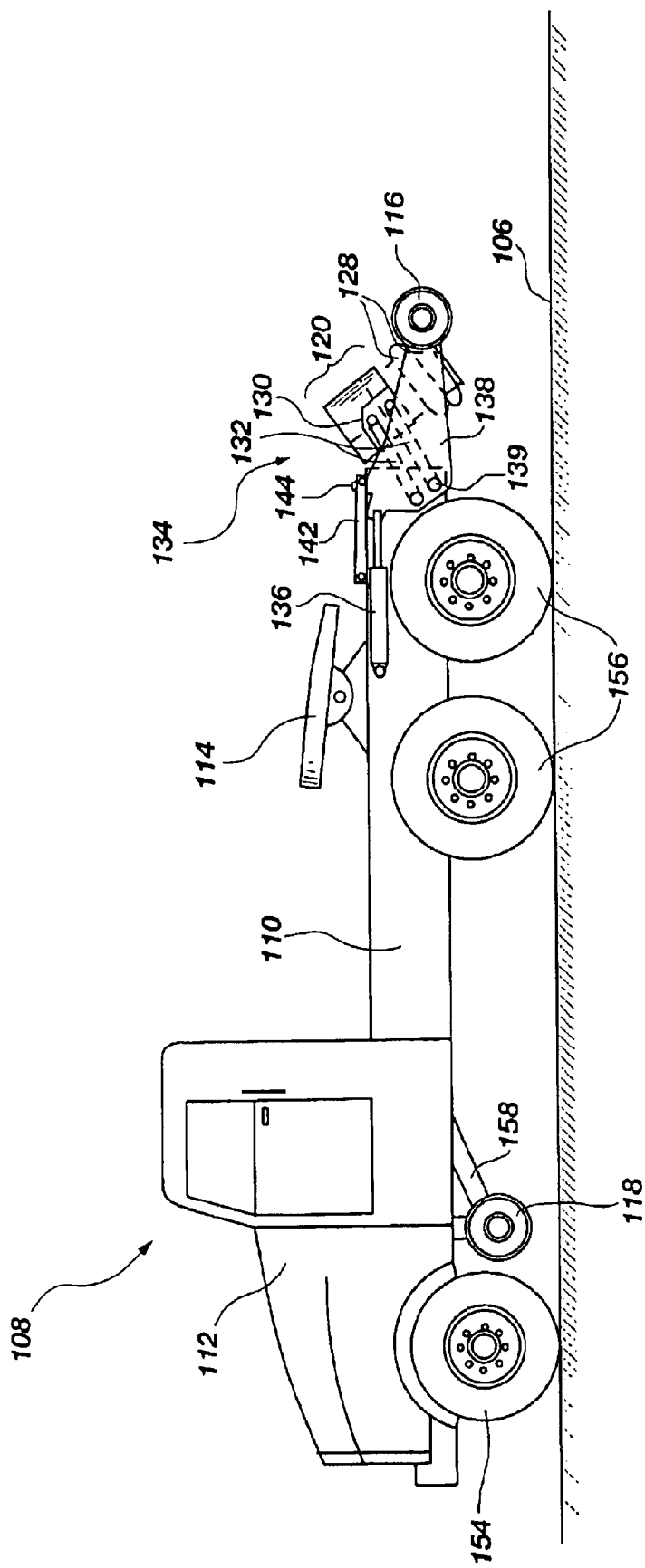
FIG. 5 is a side view of a semi tractor having high-rail wheels and a pneumatic load-shifting device in accordance with the present invention, shown with the load-shifting device raised for driving on a roadway.
Figure 6:
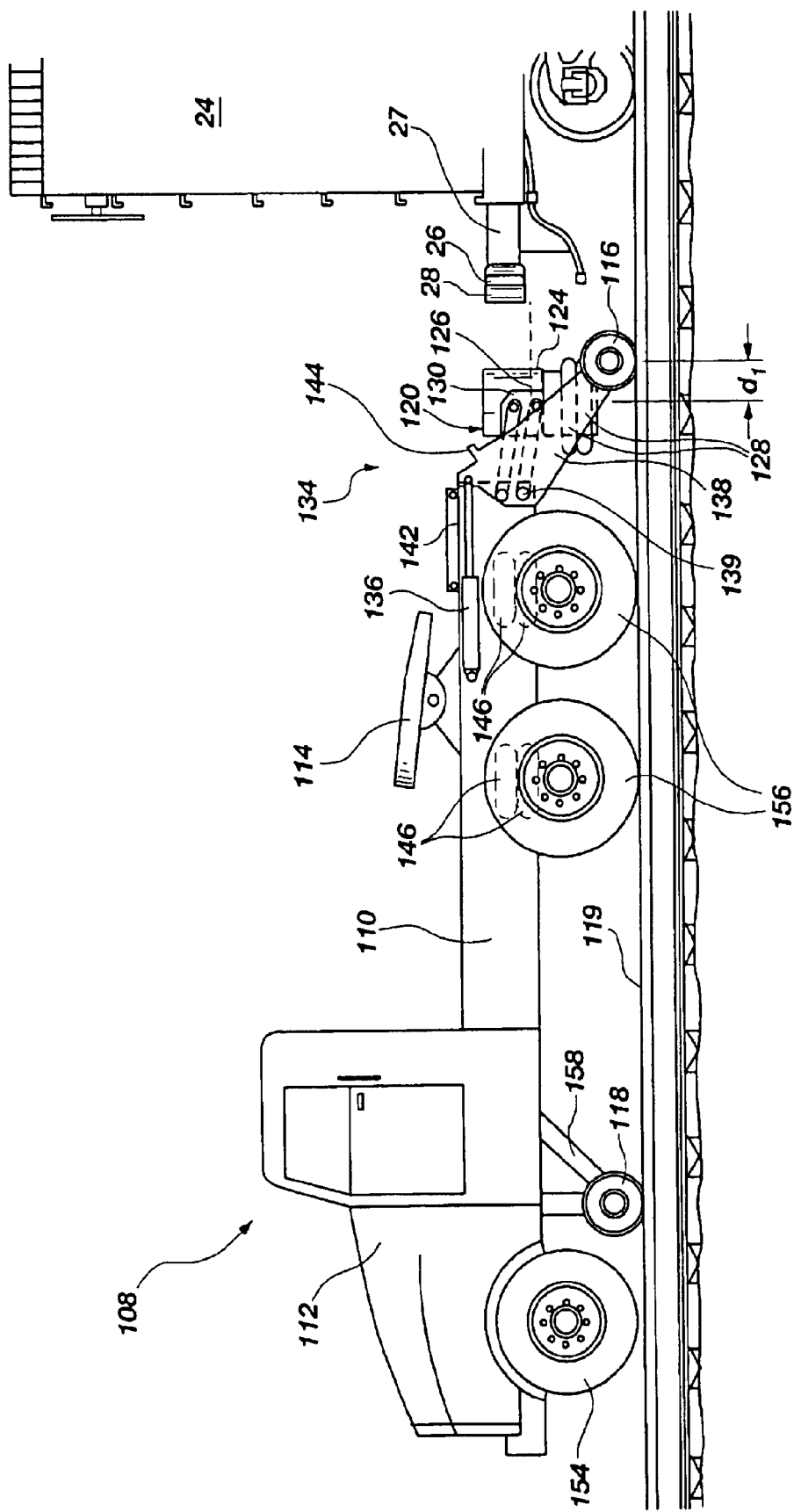
FIG. 6 is a side view of the semi tractor of FIG. 5 disposed on rails, with the high-rail wheels and load-shifting device lowered into position for connecting to a railcar.
Figure 7:
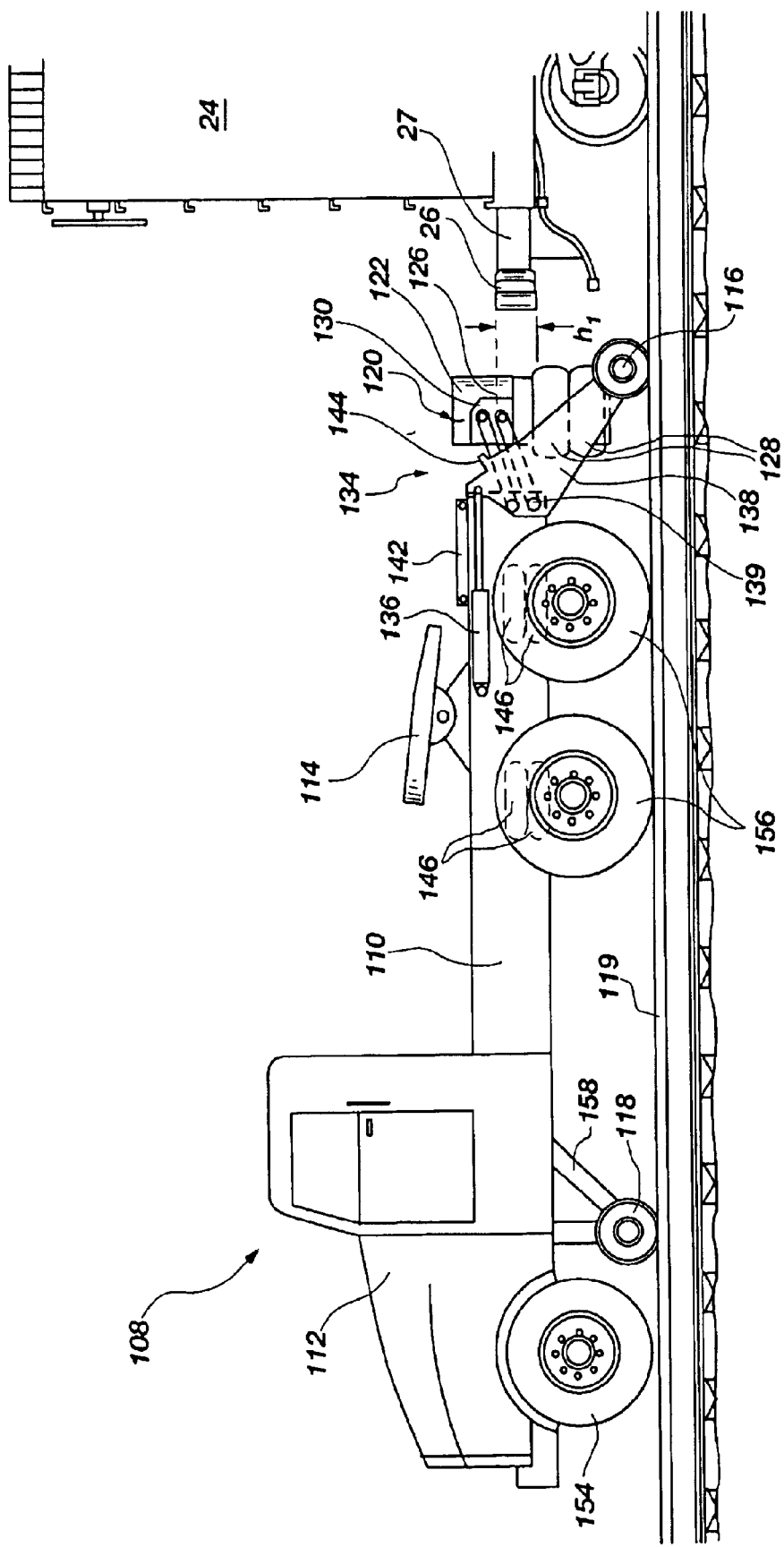
FIG. 7 is a side view of the semi tractor of FIG. 6 with the air bags inflated and the load-shifting coupler in the raised position.
Figure 8:
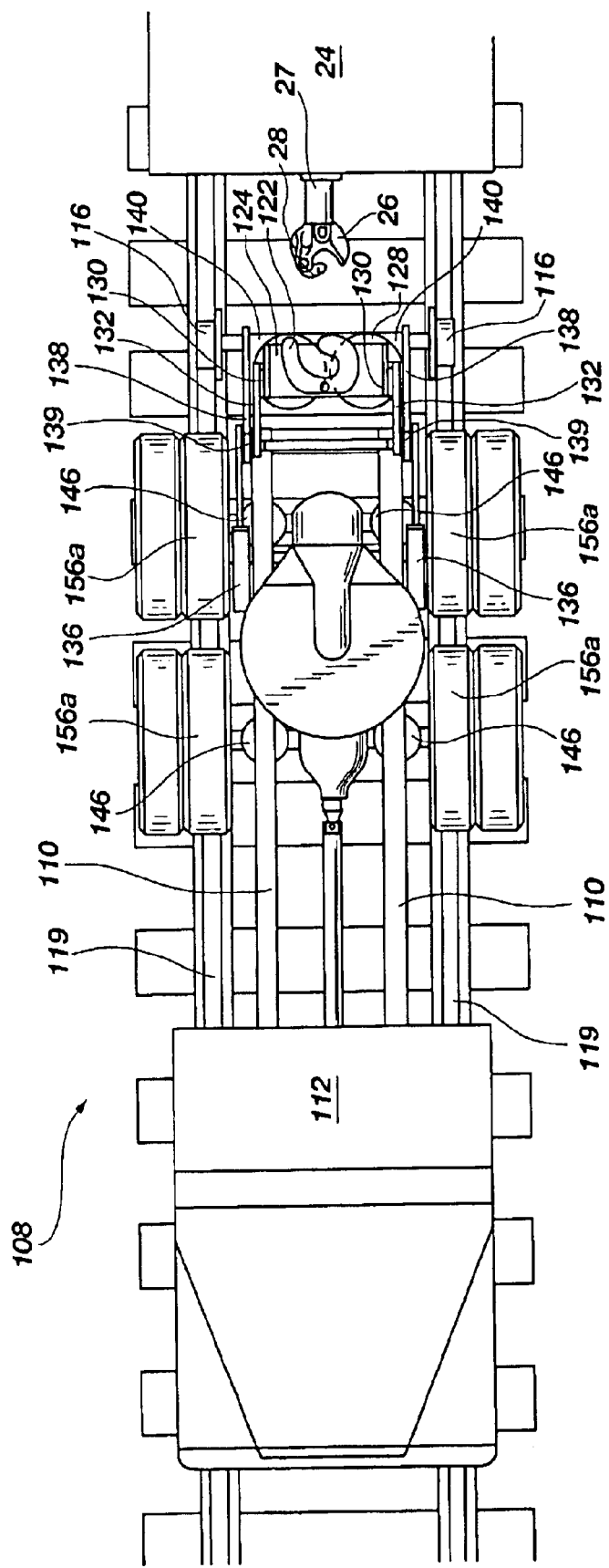
FIG. 8 is a top view of the railcar-moving vehicle on rails and with the load-shifting device in the lowered position as in FIGS. 6–7.

Referring to FIGS. 6–8, the rail wheels 116, 118 serve to guide and support the vehicle on railroad track, but are not used to drive the vehicle. The rubber-tired highway wheels need not be removed when the vehicle is used on rails. Instead, the front guide wheels 118 are hydraulically extensible and retractable by a support mechanism 158, so that the railroad guide wheels are out of the way when the tractor is operated on a roadway 106, as shown in FIG. 5, and the front wheels 152 simply hang slightly above the rails 119 when the vehicle is on the rails, as shown in FIG. 6.

Unlike the front wheels, however, the rubber-tired drive wheels 156 of the semi tractor directly contact the rails 119 to provide driving traction for the vehicle. This is also apparent from the top view of FIG. 8. Advantageously, the rails of standard railroad track are closer together than the standard wheelbase width of highway trucks. The distance between the rails is about the same as the center-to-center distance between the inner wheels 156a of the dual wheel truck tires. Consequently, these inner tires can serve as drive wheels for the vehicle on railroad track. Alternatively, single wheels spaced at the appropriate distance, rather than dual wheels, can also be used as drive wheels on the rails. Because this configuration retains all drive and support wheels normally associated with a semi tractor during railroad use, the vehicle will ordinarily not need auxiliary wheels during normal highway operation, as with the embodiment of FIG. 1.

Attached to the rearward portion of the frame 110, behind the fifth wheel assembly 114, is the pivotable lifting mechanism 134, including a lifting coupler 120 for coupling to the railcar 24. The lifting mechanism generally comprises two hinge plates 138 that are attached at pivot points 139 to the rearward sides of the vehicle frame. The hinge plates are rigidly connected side-to-side by the axle 140 of the rearward rail wheels 116, and by other framework and cross bracing elements of the lifting mechanism. The lifting mechanism is raised and lowered by a pair of hydraulic cylinders 136 disposed on each side of the vehicle frame. In the raised position, shown in FIG. 5, the hydraulic cylinders retract and rotate the hinge plates upward, so that the rear rail wheels are raised off of the ground for highway use of the vehicle. A retaining bracket 142 is hingedly attached to the upper side of the rearward portion of the vehicle frame, and is positioned to engage with a hook 144 provided on the top edge of the hinge plates. This helps lock and hold the lifting mechanism in the raised position during highway use of the vehicle.

In the lowered position, shown in FIGS. 6 and 7, the hydraulic cylinders 136 are extended so that the rear rail wheels 116 contact the rail, and the lifting coupler 120 is in a generally upright position. The lifting coupler comprises a knuckle body 122 pivotally connected to a horizontal support plate 124 that has a top support surface 126, indicated by dashed lines in FIGS. 6 and 7. The knuckle body is configured to lock with the knuckle 28 of the railcar coupler 26. The support plate is supported on the cross frame of the lifting mechanism 134 by a pair of high pressure coupler air bags 128. These air bags are similar to standard truck suspension air bags. When the coupler air bags are not inflated, as shown in FIG. 6, the top surface 126 of the support plate is at or below the elevation of the bottom side of the railcar coupler. However, when the coupler air bags are inflated, as shown in FIG. 7, this has the effect of raising the lifting coupler some vertical distance $h_1$.

Attached to the horizontal support plate 124 on either side of the knuckle body 122 are a pair of vertical guide plates 130, which are each connected to a pair of parallel arms 132. The parallel arms are each pivotally connected to the guide plates on one end, and the hinge plates 138 at the other end. The lower of the two parallel arms shares the hinge plate pivot point 139. These parallel arms keep the lifting coupler 120 in its upright orientation as it moves from the lowered position to the raised position.

The coupler air bags 128 are interconnected to an air compression system (not shown) associated with the railcar-moving vehicle 108, which also provides compressed air to a set of tractor air bags 146. The tractor air bags are common semi tractor equipment, and when inflated provide extra support against the axles of the drive wheels 156 when hauling particularly heavy loads. Those familiar with tractor trailers and other heavy trucks will be familiar with pneumatic air bag suspension systems.

Advantageously, the same pneumatic system provides compressed air to both the tractor air bags and the coupler air bags. This configuration advantageously allows the air compression system of the railcar-moving vehicle 108 to shift a portion of the weight of a coupled railcar 24 to the frame 110 of the vehicle. When the lifting mechanism 134 is initially placed in the lowered position, as shown in FIG. 6, the rear rail wheels 116 are engaged with the track 119, and the hydraulic cylinder 136 substantially rigidly holds the lifting mechanism in a fixed orientation with respect to the frame of the vehicle. With the coupler air bags 128 uninflated, the vehicle is in position to be coupled to the railcar. Once the railcar is securely coupled to the railcar-moving vehicle, the coupler air bags 128 and tractor air bags 146 are inflated (this may be done simultaneously), as shown in FIG. 7. The tractor air bags push upward on the vehicle frame, while the coupler air bags push upward on the heavy railcar. Advantageously, the lifting force of the tractor air bags is countered by the weight of the railcar on the lifting mechanism. The result is to impose a portion of the weight of the railcar onto the drive wheels 156 of the railcar-moving vehicle. This provides the traction needed to allow the vehicle to pull the railcar.

It will be apparent that because the lifting mechanism 134 is substantially rigidly fixed when in its lowered position, it essentially functions as an extension of the vehicle frame 110. Consequently, it is desirable to apply only enough pressure to the air bags to transfer sufficient weight to the drive wheels 156, and not to lift the rear rail wheels from the rails. However, if some slight rotation of the lifting mechanism does occur at the pivot point 139, load transfer will not be eliminated. Advantageously, as shown in FIG. 6, the position of the railcar load imposed onto the lifting mechanism is forward of the rear rail wheels 116 by a small distance $d_1$, which in one embodiment of the invention is from about 8" to about 12". If the lifting mechanism is allowed to pivot on its pivot point, even slightly, this will change the mechanism of load transfer. In such a situation substantial load will still be transferred because of the eccentric loading of the lifting mechanism. Specifically, because of the distance $d_1$, even if the lifting mechanism is effectively hingedly connected to the vehicle frame, part of the load from the railcar will be imposed on the rail wheel 116, and part on the vehicle frame.

It will be apparent that the compliant pneumatic suspension system will depress during the load shifting process, which depression will tend to offset the lifting of the vehicle frame. Nevertheless, the pneumatic lifting mechanism 134 must have sufficient travel to allow for this additional flexure. When unloaded, the total vertical travel $h_1$, of the lifting coupler is approximately 16 inches. However, as noted above, it is not desirable to completely unload the forward truck of the attached railcar, but merely to remove a portion of the load as needed for traction. As with the embodiment of FIG. 1, the inventor has found that total vertical travel $h_1$ of approximately 3 inches is usually sufficient to transfer the weight needed for traction, whether the railcar is loaded or unloaded.

Advantageously, the railcar-moving vehicle described herein is very economical because it may be used both on and off of the rails. Also, because it is a modified semi tractor, rather than a limited production specialty vehicle, the economics of mass production help to keep the purchase price relatively low. Moreover, conventional railcar-moving vehicles are typically only capable of speeds up to 15 or 20 miles per hour and are equipped with a hydraulic transmission, which overheats when operated at top speeds for any long period of time. The present invention in contrast, uses a standard, proven engine and drive train that is routinely capable of extended operation at high speeds. Because conventional semi-tractors are provided with anywhere from 8 to 18 different gears, they also have a wider range of running speeds and load-pulling capacity.

With this vehicle in any of the disclosed embodiments, a work crew can transport themselves, their materials, and equipment by highway to a rail siding close to a site of needed maintenance. The crew then simply transfers their materials and equipment from the highway trailer to a railcar located at that siding, moves the semi tractor onto the rails, and couples it to the railcar to travel to the work site at mainline speed. Thus the same vehicle that transports them on the highway takes them to the work site with their materials and equipment. With this hybrid vehicle, maintenance of way crews can perform their work with far less labor and capital equipment expense, and less disruption of mainline rail traffic. This invention also provides railroad customers having a need to move railcars and highway trailers with a versatile vehicle for use on or off rails at an industrial site or rail siding, and allows transport of highway trailers on public highways as well.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A railcar-moving vehicle comprising:
   a modified semi-tractor, selectively reconfigurable for operation either on or off rails, having rubber-tired drive wheels configured to contact the rails;
   a load-shifting device, rearwardly disposed on the modified semi-tractor, having a raised position and a lowered position, and including rearward rail wheels configured to contact the rails when in the lowered position;
   a lifting coupler, moveably attached to the load-shifting device above the rearward rail wheels, configured to couple to a coupler of a railcar; and
   an air bag suspension system, including air bags configured to support the modified semi-tractor above the drive wheels, and a coupler airbag disposed below the lifting coupler, configured to apply an upward force upon the lifting coupler when inflated with compressed air, so as to transfer a portion of weight of the coupled railcar to the drive wheels of the railcar-moving vehicle.

2. The railcar-moving vehicle as described in claim 1, wherein the upward force applied on the lifting coupler by the coupler air bags is greater than a downward force applied on the drive wheels by the air bag suspension system.

3. The railcar-moving vehicle as described in claim 2, wherein the load-shifting mechanism is configured to impose an additional portion of weight from the railcar onto the rearward rail wheels, the additional portion being greater than the portion transferred to the drive wheels.

4. The railcar-moving vehicle as described in claim 1, wherein the coupler air bags and the air bag suspension system are configured to have a maximum pressure of about 120 psi.

5. The railcar-moving vehicle as described in claim 1, wherein the lifting coupler is configured to move substantially vertically from a first position to a second higher position.

6. The railcar-moving vehicle as described in claim 5, further comprising parallel arms, hingedly attached to the lifting coupler, configured to maintain the orientation of the lifting coupler relative to the coupler of the railcar when moving between the first position and the second position.

7. The railcar-moving vehicle as described in claim 1, further comprising a fifth wheel connector rearwardly disposed on the vehicle, configured for connection to a highway trailer.

8. The railcar-moving vehicle as described in claim 1, wherein the lifting coupler is moveably attached to the load-shifting device forward of the rearward rail wheels and rearward of a location of connection of the load-shifting device to the vehicle, such that a portion of the weight of the railcar will be transferred to the vehicle if the load shifting device pivots with respect to the frame.

9. The railcar-moving vehicle as described in claim 8, wherein the lifting coupler is attached to the load shifting device at a point from about 8" to 12" forward of the rearward rail wheels.

10. The railcar-moving vehicle as described in claim 1, wherein the lifting coupler further comprises a horizontal support plate, and a knuckle body pivotally connected to the horizontal support plate, the knuckle body being configured to lock with the coupler of the railcar.

11. The railcar-moving vehicle as described in claim 1, further comprising a retaining bracket, hingedly attached to an upper side of the rearward portion of the vehicle frame, and configured to hold the lifting mechanism in the raised position during highway use of the vehicle.

12. A load-shifting device for shifting a portion of weight of a railcar to a railcar-moving vehicle having a vehicle frame, rubber-tired wheels for driving on a roadway, including drive wheels, and retractable railroad wheels configured to guide and support the vehicle on rails, the rubber-tired drive wheels being rearwardly disposed on the vehicle frame and configured to contact the rails, and having an air bag suspension system supporting the vehicle frame above the drive wheels, the load-shifting device comprising:
- a moveable frame, pivotally disposed on a rearward extremity of the vehicle frame, having a raised position and a lowered position, configured to be substantially rigidly fixed with respect to the vehicle frame when in the lowered position;
- rearward rail wheels disposed on the moveable frame, configured to contact the rails rearwardly of the drive wheels when the moveable frame is in the lowered position;
- a lifting coupler, attached to the moveable frame above the rearward rail wheels, configured to couple to a coupler of a railcar; and
- a coupler airbag, disposed below the lifting coupler, configured to inflate with compressed air concurrently with the air bag suspension system, such that the coupler air bag and air bag suspension system simultaneously apply upward force upon the coupler of a coupled railcar and downward force on the drive wheels, so as to transfer a portion of weight of the railcar to the drive wheels of the railcar-moving vehicle.

13. The load-shifting device as described in claim 12, wherein the upward force applied on the lifting coupler by the coupler air bags is greater than the downward force applied on the drive wheels by the air bag suspension system.

14. The load-shifting device as described in claim 13, wherein the load-shifting mechanism is configured to impose a portion of the load transferred from the railcar onto the rearward rail wheels that is greater than a portion transferred to the drive wheels.

15. The load-shifting device as described in claim 12, wherein the coupler air bags and the air bag suspension system are configured to have a maximum pressure of about 120 psi.

16. The load-shifting device as described in claim 12, wherein the lifting coupler is configured to move substantially vertically from a first position to a second higher position.

17. The load-shifting device as described in claim 16, further comprising parallel arms, hingedly attached to the lifting coupler, configured to maintain the orientation of the lifting coupler relative to the coupler of the railcar when moving between the first position and the second position.

18. The load-shifting device as described in claim 12, wherein the railcar-moving vehicle further comprising a fifth wheel connector rearwardly disposed on the vehicle frame and configured for connection to a highway trailer.

19. The load-shifting device as described in claim 12, wherein the lifting coupler is moveably attached to the moveable frame forward of the rearward rail wheels and rearward of a location of the pivotal connection of the moveable frame, such that a portion of the weight of the railcar will be transferred to the frame of the vehicle if the moveable frame pivots with respect to the frame.

20. The load-shifting device as described in claim 19, wherein the lifting coupler is attached to the moveable frame at a point from about 8" to 12" forward of the rearward rail wheels.

21. The load-shifting device as described in claim 12, wherein the lifting coupler further comprises a horizontal support plate, and a knuckle body pivotally connected to the horizontal support plate, the knuckle body being configured to lock with the coupler of the railcar.

22. The load-shifting device as described in claim 12, further comprising a retaining bracket, hingedly attached to an upper side of the rearward portion of the vehicle frame, and configured to hold the moveable frame in the raised position during highway use of the vehicle.

23. A method of shifting a portion of weight of a railcar to a railcar-moving vehicle, said method comprising the steps of:
- a) providing a railcar-moving vehicle comprising a modified semi tractor, having a frame, rubber-tired wheels for driving on a roadway, including drive wheels, and retractable railroad wheels configured to guide and support the vehicle on rails, including rearward railroad wheels, the rubber-tired drive wheels being rearwardly disposed on the frame and configured to contact the rails, and having an air bag suspension system supporting the frame above the drive wheels, a load-shifting device, pivotally disposed on the frame rearwardly of the drive wheels, having a raised position and a lowered position, the rearward rail wheels being disposed on the load-shifting device and configured to contact the rails when the load-shifting device is in the lowered position, the load-shifting device being configured to be substantially rigidly fixed with respect to the frame when in the lowered position, a lifting coupler, moveably attached to the load-shifting device above the rearward rail wheels, configured to couple to a coupler of a railcar; and a coupler airbag, disposed below the lifting coupler;

b) coupling the lifting coupler to a coupler of the railcar; and c) simultaneously inflating the coupler airbag and the air bag suspension system with compressed air, so as to apply upward force upon the coupler of the railcar and downward force on the drive wheels, and thereby transfer a portion of the weight of the railcar to the drive wheels of the railcar-moving vehicle so as to increase traction of the drive wheels on the rails.

* * * * *